Oct. 29, 1968  K. A. BRANDENBERG  3,407,833
FLUID LOGIC CIRCUIT MECHANISM
Filed Aug. 16, 1965
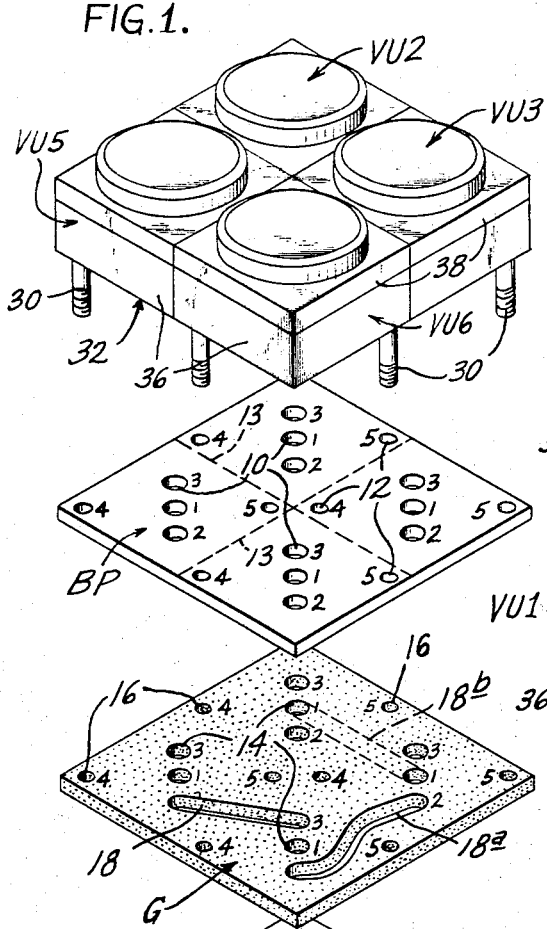
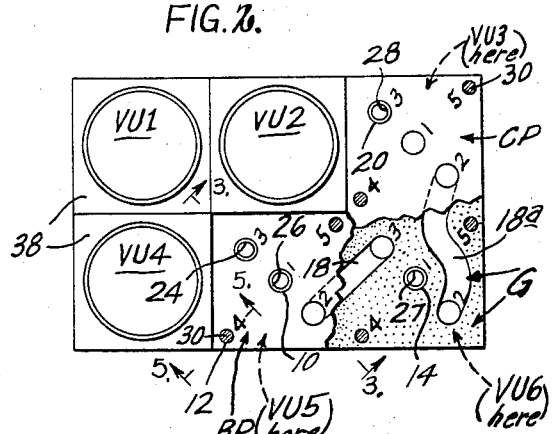
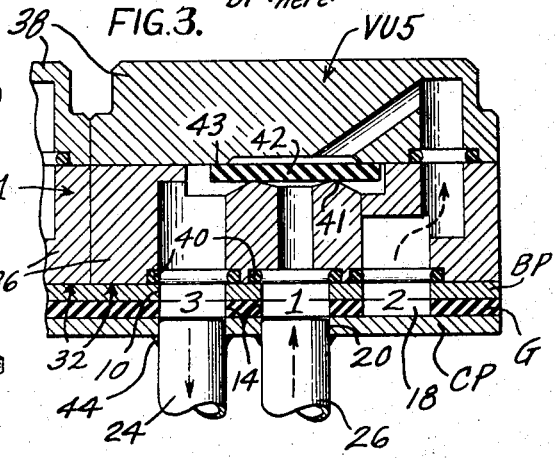
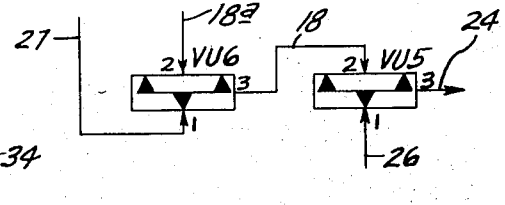
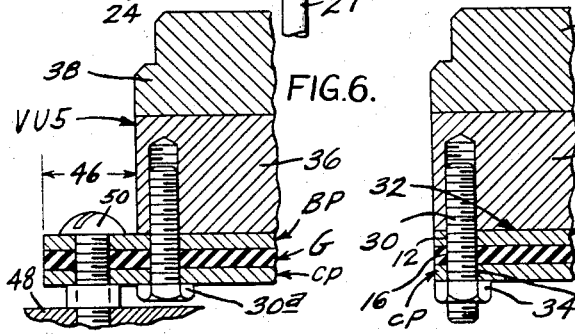
INVENTOR
KARL A. BRANDENBERG
BY Bair, Freeman & Molinare
Attys.

United States Patent Office 3,407,833
Patented Oct. 29, 1968

3,407,833
FLUID LOGIC CIRCUIT MECHANISM
Karl A. Brandenberg, Hayward, Calif., assignor, by mesne assignments, to The Aro Corporation, a corporation of Delaware
Filed Aug. 16, 1965, Ser. No. 479,758
5 Claims. (Cl. 137—271)

ABSTRACT OF THE DISCLOSURE

Mechanism for connecting fluid logic circuits comprising a base plate, a gasket and a cover plate stacked together and adapted for the mounting thereon of fluid logic valve units and the like. The base plate has a full pattern of perforations and so does the gasket, the gasket being capable of having slots cut therein from one of its perforations to another to provide lateral fluid conducting slots defined by the sides of the slots, and those surfaces of the base plate and the cover plate next to the gasket, thus providing a simple and inexpensive means for effecting fluid connections between ports of the various valve units.

---

This invention relates to a fluid logic circuit mechanism which provides a system that allows fluid logic circuits such as those powered with compressed air, oil under pressure or the like to be built from components without the use of tubing or piping except that which delivers fluid to the mechanism or carries fluid away from the mechanism, i.e., all fluid interconnections on a "circuit board" on which a plurality of valve units are mounted are accomplished in the construction of the board itself.

One object of the invention is to provide a circuit board which comprises a base plate, a gasket and a cover plate, any desired number of valve units being mounted on the assembly of these three, the cover plate having means for connecting pipes for fluid flow to and from the assembly whereas the gasket is designed as a dual function element, to wit, the usual sealing function and an interconnecting fluid circuit function. As such the gasket for each individual circuit board and valve unit assembly provides the interconnecting passageways between the various valve units mounted on the base plate.

Another object is to provide an assembly of base plate, gasket and cover plate with a plurality of valve units held against the base plate by clamp means extending therefrom and through the base plate, gasket and cover plate so that all four are held assembled in stacked relation and in fluid tight relationship.

Still another object is to provide a fluid logic circuit mechanism in which there is possibility of various combinations to give the necessary versatility in fluid logic functions comparable to electronic logic functions and wherein the valve units may operate from the usually available compressed air supply at 20 p.s.i.g. to 150 p.s.i.g.

A further object is to provide a circuit board-valve unit system for industrial applications such as are required in automation, and to provide such system simplified in respect to installations where presently logic functions are performed with conventional valves piped together or where logic functions are accomplished electrically with switches and relays and then converted into pneumatic signals.

A further additional object is to provide a fluid logic circuit mechanism comprising a base plate, a gasket against the base plate and a cover plate against the gasket wherein the base plate has a recurring pattern of fluid connection perforations for fluid passageways of fluid logic valve units adapted to be mounted on the base plate in alignment with selected ones of such patterns, the gasket also having a recurring pattern of fluid connection perforations aligned with the base plate perforations and having fluid conducting slots connecting some of the fluid connection perforations of the gasket to serve as lateral fluid connections between various of the base plate perforations, the recurring pattern of fluid connection perforations permitting the mounting of various types of valve units at different selected positions on the surface of the base plate, the pattern being repeated in one direction and also laterally of such direction if desired.

Other applications are possible in numerical control because all logic functions required for comparator circuits can be performed with the logic elements of the herein disclosed circuit mechanism.

Still a further object is to provide an arrangement in which mounting the valve elements on a circuit board of the proper design, and particularly with respect to individual design of the gasket and cover board, connects them automatically to the circuit and sealing is assured by the force of clamp screws for each valve unit.

An additional object is to provide a fluid logic circuit mechanism wherein the logic elements can be mounted on a circuit board as well as to sub-bases which allow marketing of assemblies as ported valves, manifolded valve groups and as complete logic functions.

Another additional object is to provide a fluid logic circuit mechanism in which fluid circuit boards may be designed for combining valve units for logic functions such as AND, OR, NOT, NAND, NOR, MEMORY, FLIP-FLOP, DIFFERENTIATOR, TIME DELAY and the like, and wherein properly designed valve units for each of the logic functions may be mounted on a circuit board and the gasket designed for interconnecting the proper passageways in the desired sequence of operation of the valve units whereas the cover plate of the circuit board has the necessary perforations to which outside piping may be sealed as by soldering or the like.

With these and other objects in view, my invention consists in the construction, arrangement and combination of the various parts of my fluid logic circuit mechanism, whereby the objects above contemplated are attained, as hereinafter more fully set forth, pointed out in my claims and illustrated in detail on the accompanying drawing, wherein:

FIG. 1 is an exploded perspective view of a representative stack of elements constituting my fluid logic circuit mechanism and comprising specifically a plurality of valve units, a base plate, a gasket and a cover plate;

FIG. 2 is a plan view of a six valve unit assembly wherein three of the valve units are removed and portions of a base plate, a gasket and a cover plate are each shown in plan view, a portion of the base plate being broken away to show the gasket and a portion of the gasket being broken away to show the cover plate;

FIG. 3 is a vertical enlarged sectional view on the line 3—3 of FIG. 2 showing the mounting of a valve unit on the circuit board assembly and the connection of outside piping thereto;

FIG. 4 is a diagrammatic view to show symbolically a pair of the valve units which are interconnected with each other;

FIG. 5 is an enlarged vertical sectional view on the line 5—5 of FIG. 2 showing a clamping means for the mechanism, and FIG. 6 is a similar sectional view showing a modified form of clamping means and additionally a mounting means for the circuit board of the mechanism.

On the accompanying drawing I have used the reference character BP to indicate a base plate, G a gasket and CP a cover plate of a circuit board assembly. The plates may be of any suitable metal or plastic and the gasket of rubber-like material for sealing compressibility and ease of the cutting of lateral passageways therein as required. Valve units such as VU1, VU2, etc., through VU6 are also illustrated.

The base plate BP as shown in FIG. 1 is of a size for four valve units, the divisions between valve units being indicated by dotted lines 13. For each valve unit there are five perforations in the base plate which may be numbered directly on the base plate itself such as 1, 2, 3, 4 and 5. The perforations 1, 2 and 3 are indicated 10 (base plate fluid connection perforations). The perforations 4 and 5 are indicated 12 (base plate clamp screw perforations).

The gasket G likewise has five perforations for each valve unit similarly numbered 1 through 5. The perforations 1, 2 and 3 are numbered 14 (gasket fluid connection perforations). The perforations 4 and 5 are numbered 16 (gasket clamp screw perforations). Certain of the perforations 14 are connected by gasket lateral fluid connection slots 18 and 18ª (a third slot being shown dotted and indicated at 18ᵇ). The gaskets G may be supplied in suitable unit size (such as 4-unit for FIG. 1 and 6-unit for FIG. 2) and with the five openings 14 and 16 for each valve unit to be mounted on the base plate BP. These openings 14 and 16 of course are in alignment with the five openings in the base plate for each unit, and at the time of assembly of a complete valve unit-circuit board assembly, the proper openings 14 of different valve units may be connected by cutting the slots 18 and/or 18ª, etc. as required. The slot 18ᵇ indicates one that is as yet uncut for connecting the gasket perforation No. 1 for valve unit VU3 with perforation No. 1 of valve unit VU2.

The cover plate CP is illustrated as having the cover plate clamp screw perforations 22 already formed and four of the cover plate fluid connection perforations 20 also formed as by drilling or punching, pipes 24, 26, 27 and 28 being sealed in these particular perforations as by soldering or the like indicated at 44 in FIG. 3. Eight locations for further cover plate fluid connection perforations are indicated by dotted lines.

Means is provided for clamping the entire assembly of valve units, base plates, gasket and cover plate together such as threaded studs 30 extending from the valve units and through all the perforations numbered 4 and 5 of the plates and gasket. On the lower ends of the studs, clamp nuts 34 are screwed. Thus, the base plate is held in intimate contact with the lower surface 32 of the valve units (which surfaces are in a common plane) and the gasket G is held in compression between the plates BP and CP. The gasket thus serves both as a seal between the two plates and as a means to provide interconnecting fluid passageways between desired No. 1, No. 2 or No. 3 openings of the various valve units. The valve units may be sealed to the plate BP by the use of O-rings 40 in the usual manner as shown in FIG. 3.

As an alternative arrangement, FIG. 6 shows clamp screws 30ª passing through the plates and gasket and threaded into the valve unit. FIG. 6 also shows the plates BP and CP and the gasket G extended the distance indicated 46 for the purpose of providing anchorage to a control panel or the like shown at 48, mounting screws 50 being used to mount the assembly on the control panel.

The various valve units may be designed to perform a logic function such as the one shown in FIG. 3 which performs the logic function OR, being a double check valve of specific configuration as valve shown and described in detail, and claimed in my copending application Ser. No. 513,215, filed Dec. 13, 1965. The perforations numbered 1 and 2 are inputs and the perforation 3 is an output. The input 1 has a valve seat 41 and the input 2 has a valve seat 43, a diaphragm 42 of rubber-like material normally seating against both when there is no flow to either input. When there is flow to input No. 1 (from pipe 26) the diaphragm 42 will open with respect to the seat 41 and there will be output flow through No. 3 (pipe 24). When there is input from No. 2 (lateral slot 18) the diaphragm 42 will be forced away from the seat 43 and there will be again output flow through No. 3. Thus, the double check valve shown performs the logic function OR. Each valve unit comprises a body 36 and a cover 38 as shown suitably designed for the two inputs and a single output.

Similarly, an AND logic function can be accomplished by a three-way normally closed valve having two inputs and one output, a NOT logic function can be accomplished by a three-way normally open valve, a NAND logic function can be accomplished by an AND valve plus a NOT valve, and a NOR logic function can be accomplished by an OR valve plus a NOT valve. A MEMORY logic function can be performed by a three-way normally closed valve with a retaining feature and a FLIP-FLOP logic function by two OR plus two NOT valves. Other logic element types of valves with appropriate valve functions can be provided for DIFFERENTIATOR, TIME DELAY and the like. The TIME DELAY valve, for instance, may be provided by a pneumatic timer valve unit plus an AND or a NOT unit wherein the two are in series with each other and the interconnection between the one and the other is by way of a lateral slot such as 18ᵇ in the gasket G.

From the foregoing specification it will be obvious that I have provided a flexible fluid logic circuit mechanism that can be readily assembled to perform various logic functions in series or parallel or in any other desired combination with a minimum of piping, the only required piping being that extending to and from the logic circuit mechanism assembly. The arrangement is such that it may readily fit the requirements of binary logic having the logic functions defined by presence or absence of fluid pressure. While I have indicated pneumatic pressure, it is also possible to use the mechanism for hydraulic pressure, and the disclosed mechanism is accordingly quite versatile and adaptable to use in many diversified systems using the disclosed basic assembly of base plate, cover plate, gasket (which serves as a flow control module) and valve units as illustrated in my patent drawing by way of example.

An inspection of FIG. 1 shows a recurring pattern of fluid connection perforations in the base plate BP and the gasket G. Four such patterns are shown, two of which are aligned in one direction and the other two aligned with the first two but in a direction lateral to such one direction. Obviously, this pattern may be repeated as many times as necessary for complex installations, and each pattern is capable of having a valve unit mounted thereon. The valve units can be of various types and placed in selected positions because of such recurring pattern, the positions being selected in accordance with requirements for the fluid controlling slots 18 cut into the gasket G. This arrangement of recurring patterns permits great flexibility in laying out and fabricating a fluid logic circuit assembly and permits of ready change of types of valve units and positions thereof to improve the fluid circuit arrangement by cutting new gaskets, and otherwise facilitates the fabrication of a complete operating unit for a given purpose.

Same changes may be made in the construction and arrangement of the parts of my fluid logic circuit mechanism without departing from the real spirit and purpose of my invention, and it is my intention to cover by my claims any modified forms of structure or use of mechanical equivalents which may reasonably be included within their scope.

I claim as my invention:

1. In a fluid logic circuit mechanism, an assembly comprising a plurality of valve units having base surfaces in a common plane, a base plate against said base surfaces, a gasket against said base plate and a cover plate against said gasket, means for holding said valve unit, said base plate, said gasket and said cover plate in assembled stacked fluid-tight relationship, said valve units having fluid inlet and outlet passageways through said base surfaces, said base plate having fluid connection perforations aligned with said fluid passageways of said valve units, said gasket having a complete pattern of spaced fluid connection perforations aligned with said fluid connection perforations of said base plate, said gasket also having fluid conducting slots extending from surface to surface thereof whose ends terminate at certain of said gasket perforations and which serve as lateral fluid connections between said fluid passageways of said valve units and corresponding perforations of said base plate, and fluid conducting means communicating through certain of said gasket perforations and corresponding perforations of said base plate with only those fluid passageways of said valve units required to receive fluid from and deliver fluid to sources outside of said assembly.

2. A fluid logic circuit mechanism according to claim 1 wherein said valve units have O-ring seals coacting with said base plate at the ends of and surrounding said fluid passageways thereadjacent.

3. A fluid logic circuit mechanism according to claim 1 wherein said means for holding comprises at least two clamp screws for each valve unit, said clamp screws extending through said base plate, said gasket and said cover plate, and being operable to connect said valve units to said assembly.

4. A fluid logic circuit mechanism according to claim 1 wherein said gasket is of readily cut material to facilitate the formation of said fluid conducting slots between spaced ones of said fluid connecting perforations thereof depending upon requirements for a given assembly.

5. A fluid logic circuit mechanism according to claim 1 wherein said cover plate has perforations aligned with only those fluid passageways of said valve units required to receive fluid from and deliver fluid to sources outside of said assembly, and fluid conducting pipes communicating with said cover plate perforations.

References Cited

UNITED STATES PATENTS

| | | | |
|---|---|---|---|
| 3,057,376 | 10/1962 | Agutter | 251—367 XR |
| 3,094,144 | 6/1963 | Oxley | 251—367 XR |
| 3,025,878 | 3/1962 | Hupp | 137—608 |
| 3,225,779 | 12/1965 | Lootzook | 137—81.5 |

OTHER REFERENCES

Steiner, "Universal Modular System for Pneumatic Switching Controls," July 1964, Process Control and Automation, pp. 310–312.

WILLIAM F. O'DEA, *Primary Examiner.*

H. M. COHN, *Assistant Examiner.*